US012125214B2

(12) United States Patent
Yan et al.

(10) Patent No.: US 12,125,214 B2
(45) Date of Patent: Oct. 22, 2024

(54) POWER LINE IMAGE REAL-TIME SEGMENTATION METHOD BASED ON SELF-SUPERVISED LEARNING

(71) Applicant: Zhejiang University, Hangzhou (CN)

(72) Inventors: Yunfeng Yan, Hangzhou (CN); Donglian Qi, Hangzhou (CN); Meilin Chen, Hangzhou (CN)

(73) Assignee: Zhejiang University, Hangzhou (CN)

( * ) Notice: Subject to any disclaimer, the term of this patent is extended or adjusted under 35 U.S.C. 154(b) by 404 days.

(21) Appl. No.: 17/749,179

(22) Filed: May 20, 2022

(65) Prior Publication Data

US 2022/0375100 A1    Nov. 24, 2022

(30) Foreign Application Priority Data

May 20, 2021    (CN) .......................... 202110549637.6

(51) Int. Cl.
*G06T 7/194*    (2017.01)
*G06T 5/77*    (2024.01)

(52) U.S. Cl.
CPC ............... *G06T 7/194* (2017.01); *G06T 5/77* (2024.01); *G06T 2207/20081* (2013.01); *G06T 2207/20084* (2013.01); *G06T 2207/20221* (2013.01)

(58) Field of Classification Search
CPC . G06T 7/194; G06T 5/77; G06T 2207/20081; G06T 2207/20084; G06T 7/187; G06T 7/11
See application file for complete search history.

(56) References Cited

U.S. PATENT DOCUMENTS 10,650,499 B1    5/2020    Fleizach
2021/0125313 A1    4/2021    Bai et al.

FOREIGN PATENT DOCUMENTS

CN    106600580 A    4/2017
CN    111862078 A  * 10/2020  ............... G06T 5/00

OTHER PUBLICATIONS

R. Cruz, R. M. Prates, E. F. Simas Filho, J. F. Pinto Costa and J. S. Cardoso, "Background Invariance by Adversarial Learning," 2020 25th International Conference on Pattern Recognition (ICPR), Milan, Italy, 2021, pp. 5883-5888, doi: 10.1109/ICPR48806.2021. 9413004. (Year: 2021).*

* cited by examiner

*Primary Examiner* — Matthew C Bella
*Assistant Examiner* — Janice E. Vaz
(74) *Attorney, Agent, or Firm* — Bayramoglu Law Offices LLC

(57) ABSTRACT

A method for segmenting a power line image in real time based on self-supervised learning includes: inputting an input power line sample image and power line sample image mask set for the same batch of images into a region growing algorithm to obtain a single power line sub-image and single power line mask set; randomly extracting at least one single power line image pair for combination, and combining the single power line image pair with a random background picture to generate a power line random background fusion image and power line random background mask set; and carrying out random non-repetitive region growing to obtain image inpainting regions, forming a segmentation mask with the image inpainting regions, obtaining power line segmentation images through an image inpainting algorithm, inputting the power line segmentation images into a power line real-time segmentation network for training, and carrying out predicted segmentation.

4 Claims, 6 Drawing Sheets

→ 3×3 convolution  ⇢ Transposed convolution
⇢ 3×3 convolution  ⇢ Copy and cut
   Step of 2         ⇢ 1×1 convolution
⇢ 3×3 convolution
   Dilation rate of 2

→ 3×3 convolution  ⇢ Transposed convolution
⇢ 3×3 convolution  ⇢ Copy and cut
   Step of 2
⇢ 3×3 convolution  ⇢ 1×1 convolution
   Dilation rate of 2

POWER LINE IMAGE REAL-TIME SEGMENTATION METHOD BASED ON SELF-SUPERVISED LEARNING

CROSS REFERENCE TO THE RELATED APPLICATIONS

This application is based upon and claims priority to Chinese Patent Application No. 202110549637.6, filed on May 20, 2021, the entire contents of which are incorporated herein by reference.

TECHNICAL FIELD

The present invention relates to a method for segmenting a power line image, and in particular to a method for segmenting a power line image in real time based on deep learning.

BACKGROUND

As the power industry develops rapidly in China, the scale of the power transmission and distribution lines becomes larger and larger, and routing inspection of power lines becomes an important part for guaranteeing the safe and stable operation of the power transmission and distribution lines. At present, intelligent unmanned aerial vehicle-based routing inspection becomes an indispensable operation and maintenance means in the power industry, and it has already been a normal operation in multiple places.

Currently, the unmanned aerial vehicle-based routing inspection is mostly accomplished by manual control of an operator. Since the power line is generally very small in size, the operator can hardly discover latent danger based on only the images sent back, it is also difficult for the operator to respond in time and effectively to a potential accident even if the latent danger is perceived. Therefore, in actual routing inspection process, wings of the unmanned aerial vehicle are prone to collide with or be twined with the power lines, which brings huge risk for safe flight of the unmanned aerial vehicle and stable operation of power facility. For this reason, the power line segmentation locates the power line in the picture photographed by the unmanned aerial vehicle so as to adjust the flying attitude of the unmanned aerial vehicle, which is of great importance for realizing automatic obstacle avoidance of and ensuring low-altitude flying safety of the unmanned aerial vehicle; besides, the power line segmentation is a key technology for unmanned aerial vehicle-based routing inspection of power lines.

However, traditional algorithms based on lines and line segments can only be applied in some simple and specific scenes and false detection and missed detection are prone to occur in complex scenes, and a deep learning-based segmentation model cannot be deployed on an actual embedded device of an unmanned aerial vehicle due to the fact that training with a large amount of labeled data is needed and relatively large computing power is required.

SUMMARY

In order to solve the problems described in the background section, the present invention provides a method for segmenting a power line image in real time based on self-supervised learning, so as to solve the problem in the prior art that a deep learning-based segmentation model cannot be deployed on an actual embedded device of an unmanned aerial vehicle due to the fact that training with a large amount of labeled data is needed and relatively large computing power is required because of the relatively large size of the model.

The technical scheme adopted by the present invention is as follows:

1) region separation:

an input power line sample image set Batch for the same batch of images and a power line sample image mask set BatchMask corresponding thereto are input into a region growing algorithm, a single power line sub-image corresponding to each power line in each input power line sample image and a single power line mask corresponding to the single power line sub-image are obtained through processing with the region growing algorithm, the single power line sub-images of all the input power line sample images constitute a power line sub-image set Batch', and the single power line masks of the single power line sub-images of all the input power line sample images constitute a single power line mask set BatchMask';

2) random combination:

2.1) each power line sub-image in the power line sub-image set Batch' and a corresponding single power line mask in the single power line mask set BatchMask' constitute a single power line image pair, and at least one single power line image pair is randomly taken out from the power line sub-image set Batch' and the single power line mask set BatchMask' and combined, and then combined with a random background picture to generate a power line random background fusion image and a power line random background mask;

2.2) the step 2.1) is repeated multiple times, and at least one single power line image pair is randomly taken out for each time to combine with different random background images, so as to obtain a power line random background fusion image set Batch" and a power line random background mask set BatchMask";

the random background picture is a picture matched with a power line detection scene but without a power line, and is usually an outdoor nature picture.

3) image inpainting:

each power line random background mask in the power line random background fusion image set Batch" and the power line random background mask set BatchMask" is subjected to non-repetitive region growing at random number of times and random steps to obtain image inpainting regions; the image inpainting regions obtained by the growing of each power line random background mask together form an inpainting mask, and then the inpainting mask is input into an image inpainting algorithm for inpainting and filling power line random background fusion images corresponding to the inpainting mask so as to obtain power line segmentation images; a final power line segmentation mask is obtained by subtracting the inpainting mask from the random background mask, a power line segmentation image and a power line segmentation mask together constitute a power line segmentation image pair, and all power line images in the power line random background fusion image set Batch" and corresponding power line random background masks in the power line random background mask set BatchMask" form a final power line image set Batch''' and a final power line mask set BatchMask''', respectively;

the image inpainting region in the step 3) is a growing region obtained by the non-repetitive region growing of the mask of each sample at random number of times and random steps.

4) the final power line image set Batch''' and the final power line mask set BatchMask''' obtained in the step 3) are input into a power line real-time segmentation network SaSnet for training, and a power line scene image to be detected is processed by using the trained power line real-time segmentation network SaSnet to obtain a predicted segmentation result.

The power line scene image is an image which is photographed from a power line scene and needs to be subjected to power line segmentation.

According to the sequential processing of the region separation, the random combination and the image inpainting, a small amount of original input power line sample image set can be greatly expanded without repetition, and a large amount of labeled power line sample data is generated for training of the power line real-time segmentation network SaSnet.

The power line real-time segmentation network SaSnet mainly consists of an input module, a fusion module and an output module; input of the power line real-time segmentation network SaSnet is RGB three-channel color images, the input module is composed of two continuously connected first convolution-normalization modules, the first convolution-normalization module is mainly formed by sequentially connecting a convolution layer, a batch normalization layer and a Relu activation function, output is a unified feature map, and the number of channels is 64; the fusion module processes the unified feature map to generate a plurality of scale feature maps, and the plurality of scale feature maps are spliced together to fuse shallow detail information and deep semantic information therein; the output module is mainly formed by sequentially connecting a convolution layer and two continuous first convolution-normalization modules;

the fusion module comprises three scale stages, the unified feature map is input into each of the three scale stages to obtain corresponding scale feature maps, and then the scale feature maps are spliced together and input into the output module; the first scale stage is the process of directly outputting the unified feature map; the second scale stage is mainly formed by sequentially connecting a convolution layer with a step of 2, two continuous first convolution-normalization modules and a transposed convolution layer; the third scale stage is basically the same as the second scale stage, except that the two continuous first convolution-normalization modules are replaced by two continuous second convolution-normalization modules, wherein the second convolution-normalization module and the first convolution-normalization module are different only in that the convolution layer is replaced by a dilated convolution layer.

In the 2.1), specifically, pixels of each power line sub-image in the at least one single power line image pair are superimposed on the random background image to obtain the power line random background fusion image, and each single power line mask in a corresponding single power line image pair is subjected to superimposition to obtain the power line random background mask.

The input in the step 1) of the present invention is an image set for one batch of images, and the output is an image set for a new batch of images; namely, this is an online algorithm.

In the present invention, by the sequential processing of the region separation, the random combination and the image inpainting for a small amount of existing labeled power line image data, a small amount of original input power line sample image set is greatly expanded without repetition, and a large amount of labeled power line sample data is generated for training of the power line real-time segmentation network SaSnet.

in the power line segmentation network SaSnet of the present invention, the design of pursuing large receptive field and long-distance dependence of traditional deep learning networks is abandoned, a relatively small receptive field is used for reducing parameters and improving running speed of a model, and a plurality of scale feature maps are spliced together and shallow detail information and deep semantic information are fused, so as to obtain better segmentation effect and reduce the calculation amount of the model. Therefore, the power line segmentation network SaSnet of the present invention can be deployed on actual embedded device of an unmanned aerial vehicle and has wide application prospect.

By the method of the present invention, training is carried out with a very small amount of labeled data (50 images). F1-Score on the open data set GTPLD is 0.6640 and 0.6407, respectively, while the test speed at 1080Ti is 30.13 fps and 48.65 fps, respectively. Both the precision and the speed on the open data set exceed those of the existing optimal method.

The technical scheme provided by the present invention can have the following beneficial effects:

1) by using the present invention, a small amount of original input power line sample image set can be greatly expanded without repetition, and a large amount of labeled power line sample data is generated for training of a deep learning network.

2) The design of the power line segmentation network SaSnet reduces the calculation amount of the model, so that the deep learning model can be deployed on an actual embedded device of an unmanned aerial vehicle.

BRIEF DESCRIPTION OF THE DRAWINGS

The accompanying drawings, which are incorporated in and constitute a part of this specification, illustrate embodiments consistent with the present invention and together with the description, serve to explain the principles of the present invention.

Figure 1:
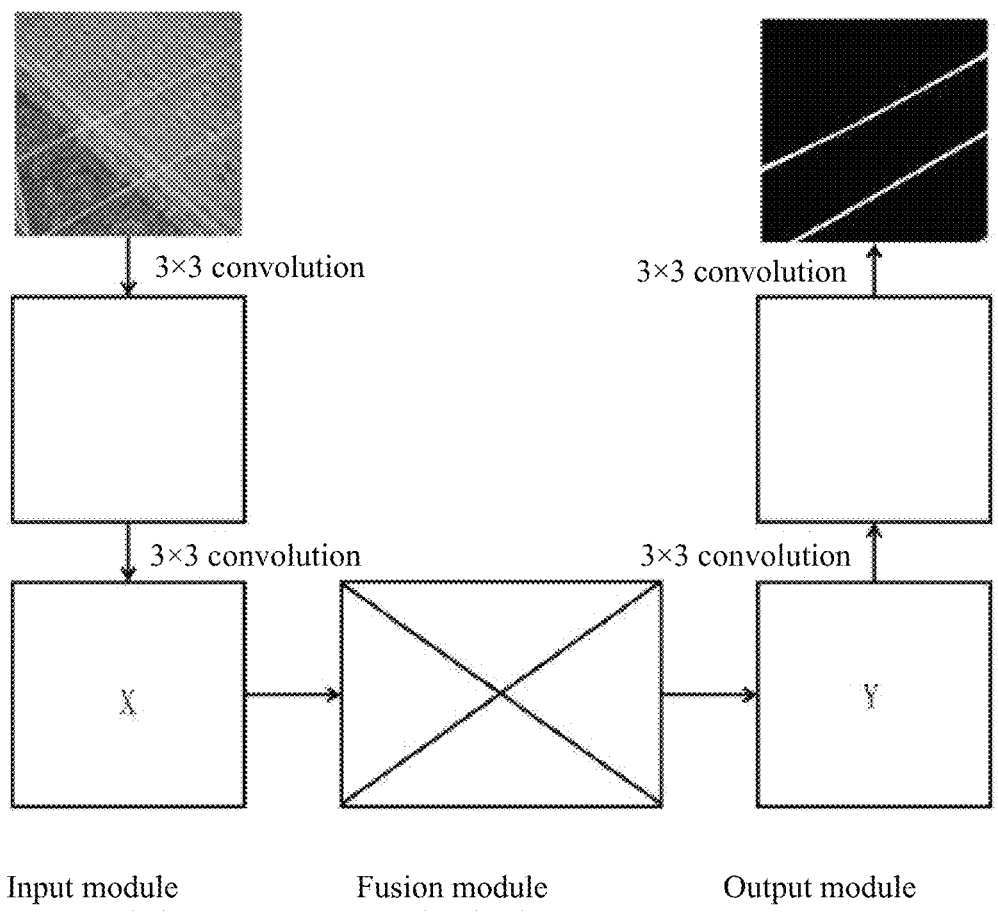
FIG. 1 is a structural diagram of a power line real-time segmentation network SaSnet according to the present invention.

Table 1 is a diagram showing the results of the comparison between the present method and other methods.

DETAILED DESCRIPTION OF THE EMBODIMENTS

Exemplary embodiments will be illustrated in detail here, and examples thereof are shown in the accompanying drawings. When accompanying drawings are involved in the description below, the same numbers in different drawings represent the same or similar elements, unless otherwise indicated. The modes of implementation described in the following exemplary embodiments do not represent all modes of implementation consistent with the present invention. Rather, they are merely examples of apparatus and methods consistent with certain aspects of the present invention detailed in the appended claims.

The terminology used herein is for the purpose of describing particular embodiments only and is not intended to be limiting of the present invention. As used in the present invention and the appended claims, the singular forms "a", "an" and "the" are intended to include the plural forms as well, unless the context clearly indicates otherwise. It should also be understood that the term "and/or" as used herein refers to and encompasses any and all possible combinations of one or more of the associated listed items.

It should be understood that although the terms first, second, third, etc. may be used herein to describe various information, such information should not be limited by these terms. These terms are only used to distinguish the same type of information. For example, first information may also be referred to as second information, and similarly, second information may also be referred to as first information, without departing from the scope of the present invention. The word "if," as used herein, may be interpreted as "when . . . " or "in response to determining . . . " depending on the context.

Figure 4:
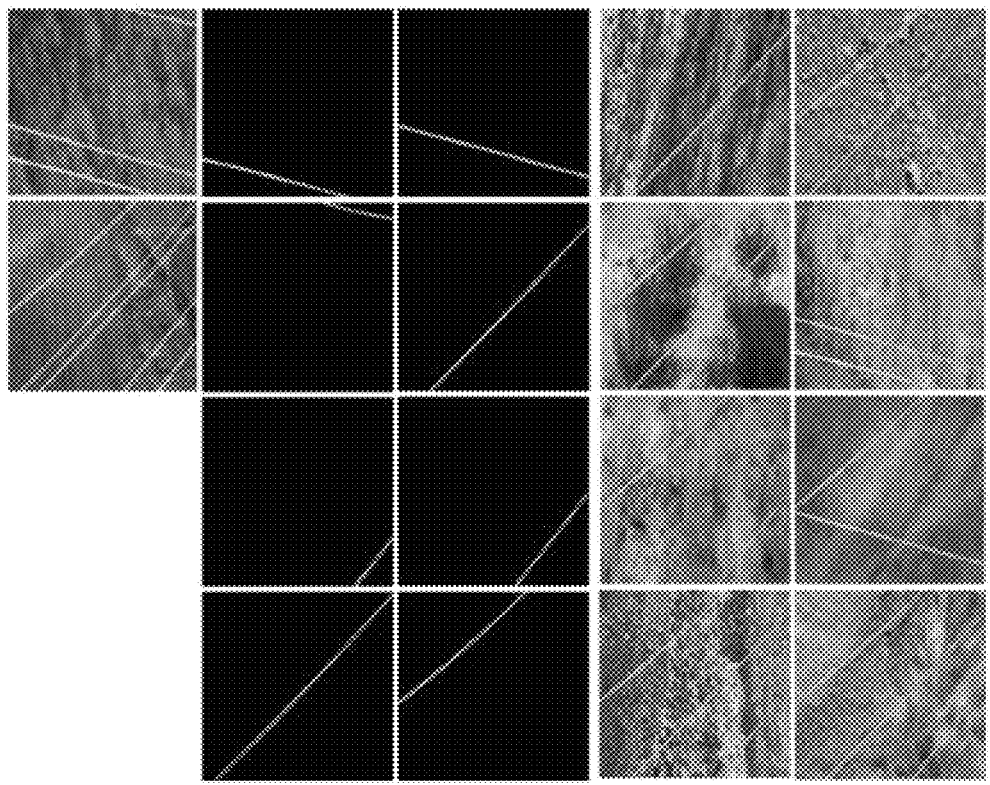
FIG. 4 is an example of region separation and random combination.
Figure 5:
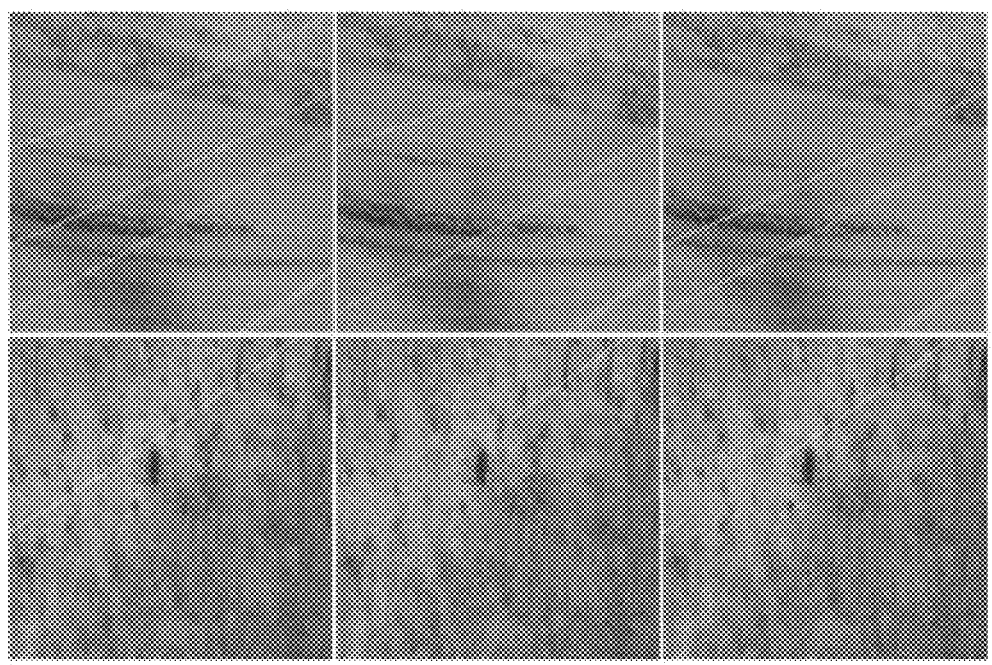
FIG. 5 is an example of image inpainting.

The process of the embodiment of the present invention is as follows:

1) region separation:
   an input power line sample image set. Batch for the same batch of images and a power line sample image mask set BatchMask corresponding thereto are input into a region growing algorithm, each power line sample image in the input power line sample image set Batch has a corresponding power line sample image mask in the power line sample image mask set BatchMask, each input power line sample image may contain one or more power lines, a single power line sub-image corresponding to each power line in each input power line sample image and a single power line mask corresponding to the single power line sub-image are obtained through processing with the region growing algorithm, the single power line sub-images of all the input power line sample images constitute a power line sub-image set Batch', and the single power line masks of the single power line sub-images of all the input power line sample images constitute a single power line mask set Batchmask';
   the region growing algorithm separates out the power lines from each power line sample image in the input power line sample image set Batch for the same batch of images, wherein since there is generally more than one power line in each power line sample image, K is usually ≥N, K representing a total number of single power line sub-images in the power line sub-image set Batch', and N representing a total number of input power line sample images in the input power line sample image set Batch;

2) random combination:
2.1) for the power line sub-image set Batch' and the single power line mask set BatchMask', each power line sub-image in the power line sub-image set Batch' and a corresponding single power line mask in the single power line mask set BatchMask' constitute a single power line image pair, and at least one single power line image pair is randomly taken out from the power line sub-image set Batch' and the single power line mask set BatchMask' and combined, and then combined with a random background picture to generate a new power line random background fusion image and a new power line random background mask;
   in the 2.1), specifically, pixels of each power line sub-image in the at least one single power line image pair are superimposed on a random background image to obtain the power line random background fusion image, and each single power line mask in the at least one single power line image pair is subjected to pixel superimposition to obtain the power line random background mask;
2.2) the step 2.1) is repeated multiple times, and a single power line image pair is randomly taken out for each time to combine with different random background images so as to obtain a power line random background fusion image set Batch" and a power line random background mask set BatchMask"; power line random background fusion images of all the random background pictures constitute the set Batch", and power line random background masks of all the random background pictures constitute the power line random background mask set BatchMask";

3) image inpainting:
   each power line random background mask in the power line random background fusion image set Batch" and the power line random background mask set BatchMask" is subjected to non-repetitive region growing at random number of times and random steps to obtain image inpainting regions; the image inpainting regions obtained by the growing of each power line random background mask together form an inpainting mask, and then the inpainting mask is input into an image inpainting algorithm Navier-Stokes for inpainting and filling the power line random background fusion images corresponding to the inpainting mask so as to obtain power line segmentation images namely, an region in the power line random background fusion image corresponding to the growing region is filled with surrounding pixels to remove the part of the growing region in the power line random background fusion image, a power line segmentation image and a segmentation mask together constitute a power line segmentation image pair, and power line segmentation image pairs generated from each power line image in the power line random background fusion image set Batch" and a corresponding power line random background mask in the power line random background mask set BatchMask" form a final power line image set Batch'" and a final power line mask set BatchMask'";
   examples of region separation, random combination and image inpainting in specific implementation are shown in FIGS. 4 and 5;

4) the final power line image set Batch'" and the final power line mask set BatchMask'" obtained in the step 3) are input into a power line real-time segmentation network SaSnet for training.

As shown in FIG. 1, the power line real-time segmentation network SaSnet mainly consists of an input module, a fusion module and an output module; input of the power line real-time segmentation network SaSnet is RGB three-channel color images, the input module is composed of two continuously connected first convolution-normalization modules, the first convolution-normalization module is mainly formed by sequentially connecting a 3×3 convolution layer, a batch normalization layer and a Relu activation function, output is a unified feature map, and the number of channels is 64; the input module extracts detail information such as outline and color of an input power line picture.

Figure 2:
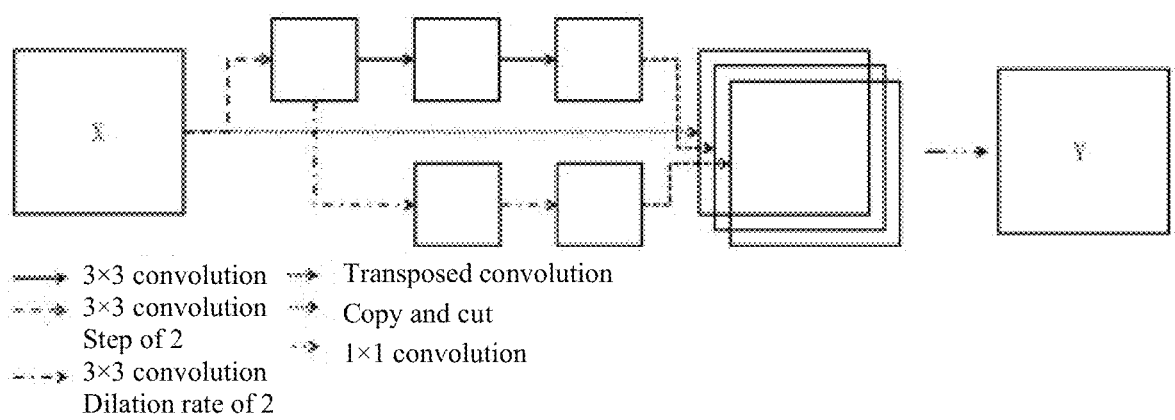
FIG. 2 is a structural diagram of a fusion module.

As shown in FIG. 2, the fusion module processes the unified feature map to generate a plurality of scale feature maps, and the plurality of scale feature maps are spliced together to fuse shallow detail information and deep semantic information therein so as to achieve better segmentation effect;

the fusion module comprises three scale stages, the unified feature map is input into each of the three scale stages to obtain corresponding scale feature maps, and then the scale feature maps are spliced together and input into the output module;

the first scale stage is the process of directly outputting the unified feature map, and can be specifically set as the process of copying and cutting;

the second scale stage is mainly formed by sequentially connecting a convolution layer with a step of 2, two continuous first convolution-normalization modules and a transposed convolution layer, wherein the convolution layer with the step of 2 is adopted for down-sampling, then two first convolution-normalization modules are superposed, and then 2-fold up-sampling is performed by using the transposed convolution layer capable of learning;

the third scale stage is basically the same as the second scale stage, except that the two continuous first convolution-normalization modules are replaced by two continuous second convolution-normalization modules, wherein the second convolution-normalization module and the first convolution-normalization module are different only in that the convolution layer is replaced by a dilated convolution layer, and dilation rate is set to be 2. Therefore, based on the different setting of the second convolution-normalization module, a larger receptive field can be obtained without reducing resolution.

Figure 3:
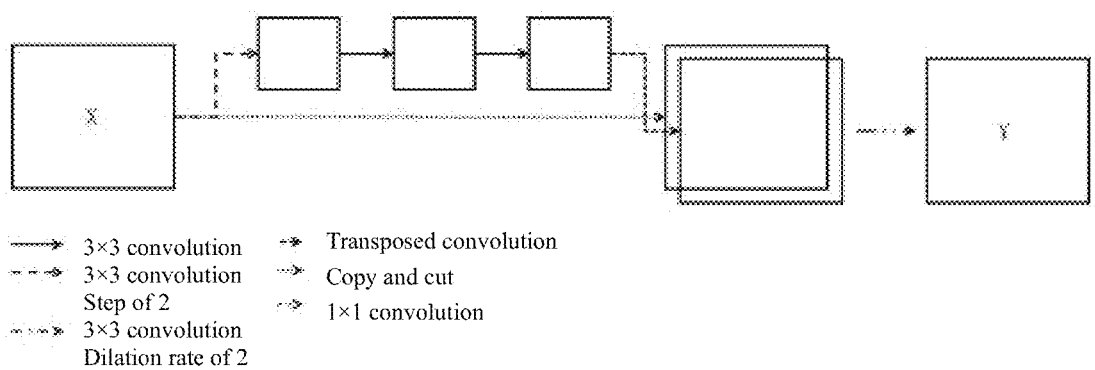
FIG. 3 is a structural diagram of a fast fusion module.

In specific implementation, as shown in FIG. 3, the third scale stage in the fusion module is deleted to form a fast fusion module, and compared with the fast fusion module, the fast fusion module has smaller calculation amount and can perform fast processing on a platform with smaller computing power without significantly reducing precision.

The output module is mainly formed by sequentially connecting a 1×1 convolution layer and two continuous first convolution-normalization modules. In specific implementation, the resulting map obtained by splicing the 64-channel different scale feature maps is input into the output module, wherein the different feature maps are firstly each filled to reach the size of an original image, then the 1×1 convolution layer fuses different scale features, and then a 1-channel predicted segmentation map is finally output after processing with the two first convolution-normalization modules.

Finally, a power line scene image to be detected is processed by using the trained power line real-time segmentation network SaSnet to obtain a predicted segmentation result.

The present invention can generate new label data based on existing small amount of label data and thereby greatly improve the precision of the model under the condition of less data volume.

Figure 6:
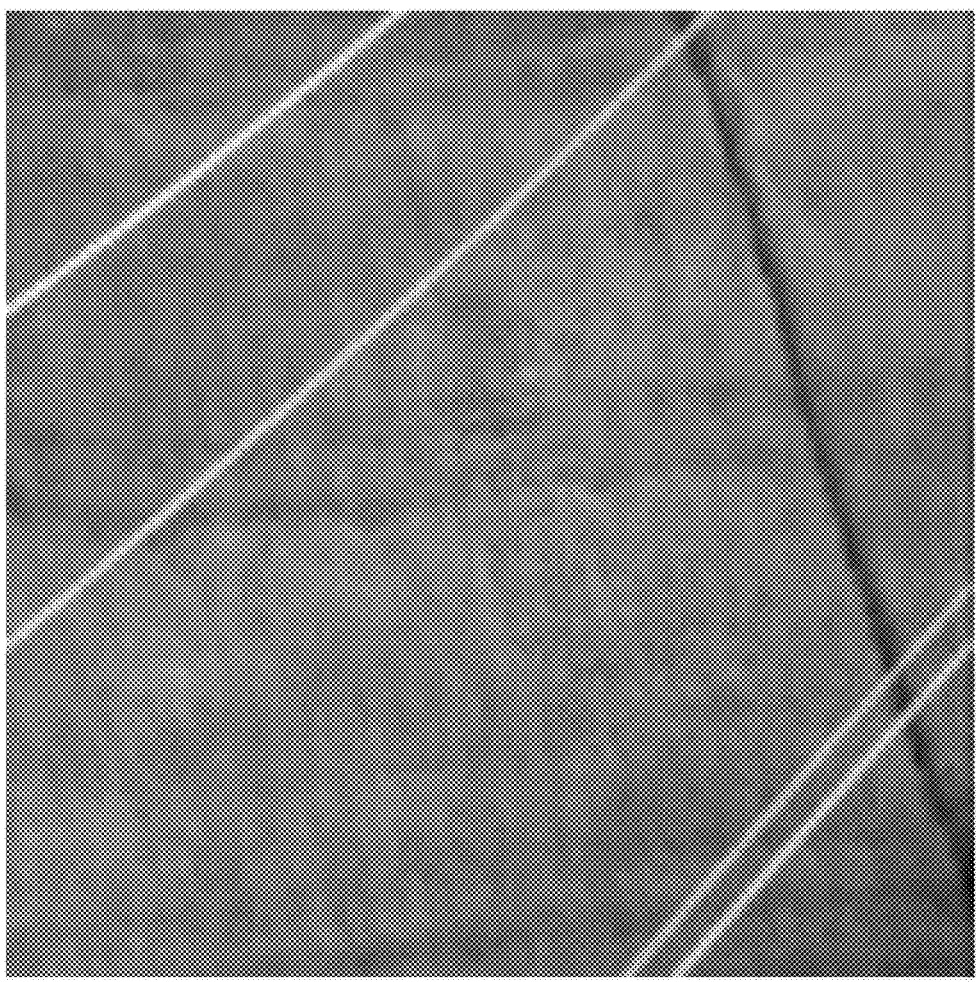
FIG. 6 is a power line image sample acquired by a camera of an unmanned aerial vehicle.

Specifically, the specific implementation of the present invention in the actual scene is as follows:

1) a small number of live images containing power lines are collected by photographing via a camera of an unmanned aerial vehicle or by searching online (as shown in FIG. 6);

2) all collected live images containing power lines are traversed, pixel-level labeling of power lines is performed for each image by using polygons to obtain corresponding labeled files which form a power line image data set together with the original images;

3) images in the power line image data set are subjected to scaling to adjust the size of the images to 512×512, corresponding labeled files are subjected to the same scaling, and then the data set is divided into a training set and a verification set according to a ratio of about 4:1;

4) the power line real-time segmentation network SaSnet is trained with the training set in the power line image data set; specifically, all images and labels thereof in the training set are randomly divided into a plurality of batches, and the batches of images are sequentially input into the power line real-lime segmentation network SaSnet.

5) each batch of images Batch and corresponding labels BatchMask input into the power line real-time segmentation network SaSnet are subjected to region separation, random combination and image inpainting successively to generate the final power line image set Batch''' and the final power line mask set BatchMask'''.

6) The step 4) and the step 5) are continuously repeated, and the model effect is verified by using the verification set to obtain an optimal segmentation model on the verification set.

7) The optimal segmentation model obtained in the step 6) is deployed on an embedded device of an unmanned aerial vehicle;

8) a live image of a transformer substation acquired by the camera of the unmanned aerial vehicle in real time is scaled to 512×512 according to the same image scaling method as that in the step 2) and used as the input of the optimal segmentation model to obtain a mask of a power line in the image, and then automatic obstacle avoidance can be realized by controlling the unmanned aerial vehicle according to the pixel coordinates of the power line in the mask.

TABLE 1

| Method | Segmentation precision (F1-score) | Segmentation speed (Fps/1080Ti) |
|---|---|---|
| WD-DCNN | 0.4835 | — |
| LS-Net-W2 | 0.5344 | 20.40 |
| LS-Net-W3 | 0.5256 | 20.40 |
| LS-Net-S | 0.5940 | 20.40 |
| Unet | 0.4801 | 27.07 |
| The method disclosed herein with fast fusion module | 0.6407 | 48.65 |
| The method disclosed herein with fusion module | 0.6640 | 30.13 |

In specific implementation, the results of comparison between the present invention and various methods are shown in Table 1. With very small amount of labeled data (50 images) as the training data, F1-score for the fast fusion module and the fusion module tested on the open data set GTPLD is 0.640 and 0.664, respectively, while the run speed at 1080Ti is 48.65 fps and 30.13 fps, respectively. The precision and the speed of the fusion module exceed those of the existing optimal method, and the inference speed of the fast fusion module greatly exceeds that of the existing method while keeping relatively high precision.

Other embodiments of the present invention will be apparent to those skilled in the art based on the specification and practice of the disclosure disclosed herein. The present invention is intended to cover any variations, uses or adaptive changes of the present invention that follow the general principles of the present invention and comprise common general knowledge and conventional technical means that are within the art to which the present invention pertains and are not disclosed in the present invention. The specification and embodiments shall be considered as exemplary only, with a true scope and spirit of the present invention being indicated by the following claims.

It should be understood that the present invention is not limited to the precise arrangements that have been described above and shown in the drawings, and that various modifications and changes can be made without departing from the scope of the present invention. The scope of the present invention is limited only by the appended claims.

What is claimed is:

1. A method for segmenting a power line image in real time based on self-supervised learning, comprising:
   step 1: a region separation, wherein the region separation comprises:
   inputting an input power line sample image set Batch for a same batch of images and a power line sample image mask set BatchMask corresponding to the input power line sample image set Batch into a region growing algorithm, obtaining a single power line sub-image corresponding to each power line in each input power line sample image and a single power line mask corresponding to the single power line sub-image through processing with the region growing algorithm,
   wherein single power line sub-images of input power line sample images constitute a power line sub-image set Batch', and single power line masks of the single power line sub-images of the input power line sample images constitute a single power line mask set BatchMask';
   step 2: a random combination, wherein the random combination comprises:
   step 2.1: constituting a single power line image pair by each power line sub-image in the power line sub-image set Batch' and a corresponding single power line mask in the single power line mask set BatchMask', and randomly taking at least one single power line image pair out from the power line sub-image set Batch and the single power line mask set BatchMask' to combine, and combining the at least one single power line image pair with a random background image to generate a power line random background fusion image and a power line random background mask;
   step 2.2: repeating step 2.1 multiple times, and randomly taking the at least one single power line image pair out for each time to combine with different random background images, to obtain a power line random background fusion image set Batch" and a power line random background mask set BatchMask";
   step 3: a image inpainting, wherein the image inpainting comprises:
   subjecting each power line random background mask in the power line random background fusion image set Batch" and the power line random background mask set BatchMask" to a non-repetitive region growing at a random number of times and random steps to obtain image inpainting regions, forming an inpainting mask by the image inpainting regions obtained by a growing of each power line random background mask together, and inputting the inpainting mask into an image inpainting algorithm for inpainting and filling power line random background fusion images corresponding to the inpainting mask to obtain power line segmentation images, obtaining a final power line segmentation mask by subtracting the inpainting mask from the power line random background mask,
   wherein a power line segmentation image and a power line segmentation mask together constitute a power line segmentation image pair, and power line segmentation image pairs generated from each power line image in the power line random background fusion image set Batch" and a corresponding power line random background mask in the power line random background mask set BatchMask" form a final power line image set Batch''' and a final power line mask set BatchMask''';
   step 4: inputting the final power line image set Batch''' and the final power line mask set BatchMask''' obtained in step 3 into a power line real-time segmentation network SaSnet for training to obtain a trained power line real-time segmentation network SaSnet, and processing a power line scene image to be detected by using the trained power line real-time segmentation network SaSnet to obtain a predicted segmentation result.

2. The method according to claim 1, wherein: the power line real-time segmentation network SaSnet comprises an input module, a fusion module and an output module; an input of the power line real-time segmentation network SaSnet is red-green-blue (RGB) three-channel color images, the input module is composed of two first continuously connected first convolution-normalization modules, each of the two first continuously connected first convolution-normalization modules is formed by sequentially connecting a first convolution layer, a batch normalization layer and a Relu activation function; an output of the power line real-time segmentation network SaSnet is a unified feature map, and a number of channels of the unified feature map is 64; the fusion module processes the unified feature map to generate a plurality of scale feature maps, and the plurality of scale feature maps are spliced together to fuse shallow detail information and deep semantic information in the plurality of scale feature maps; the output module is formed by sequentially connecting a second convolution layer and two second continuously connected first convolution-normalization modules;
   wherein the fusion module comprises a first scale stage, a second scale stage and a third scale stage; the unified feature map is respectively input into the first scale stage, the second scale stage and the third scale stage to obtain the plurality of scale feature maps, and the plurality of scale feature maps are spliced together and input into the output module; the first scale stage is a process of directly outputting the unified feature map; the second scale stage is formed by sequentially connecting a third convolution layer with a step of 2, two third continuously connected first convolution-normalization modules and a transposed convolution layer; the third scale stage is the same as the second scale stage except that the two third continuously connected first convolution-normalization modules are replaced by two continuously connected second convolution-normalization modules, wherein each of the two continuously connected second convolution-normalization modules and each of the two third continuously connected first convolution-normalization modules are different in that the third convolution layer is replaced by a dilated convolution layer.

3. The method according to claim 1, wherein: in step 2.1, pixels of each power line sub-image in the at least one single power line image pair are superimposed on the random background image to obtain the power line random background fusion image, and each single power line mask in a corresponding single power line image pair is subjected to a superimposition to obtain the power line random background mask.

4. The method according to claim 1, wherein: an input in step 1 is an image set for one batch of images, and an output in step 1 is an image set for a new batch of images.

* * * * *